United States Patent Office 2,875,233
Patented Feb. 24, 1959

2,875,233
METHOD FOR THE PREPARATION OF O-ARYL PHOSPHOROAMIDOTHIOATES

Etcyl H. Blair, Kenneth C. Kauer, and Edgar C. Britton, Midland, Mich., assignors to The Dow Chemical Company, Midland, Mich., a corporation of Delaware No Drawing. Application March 5, 1956
Serial No. 569,297

8 Claims. (Cl. 260—461)

This invention relates to an improved method for the preparation of O-aryl phosphoroamidothioates having the following formula

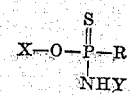

In this and succeeding formulae, X represents an aryl group, Y represents hydrogen or a lower alkyl radical and R represents NHY or an alkoxy group. The term "aryl" as herein employed refers to the aromatic hydrocarbon radicals whether unsubstituted or substituted with one or more substituents including chlorine, bromine, alkyl, alkoxy, cyclohexyl, benzyl and phenyl. The term "lower alkyl" refers to the alkyl radicals containing from one to two carbon atoms, inclusive. The O-aryl phosphoroamidothioates are useful as parasiticides for the control of bacteria, fungi, mites and insects, such as aphids, southern army worms and flies. These compounds are also valuable as preservatives for paper, paint and wood.

Heretofore, the O-aryl phosphoroamidothioates have been prepared by several methods. In one of these methods an O-aryl phosphorodichloridothioate is reacted with anhydrous ammonia or a suitable anhydrous amine, successively with two different anhydrous amines or successively with a suitable anhydrous amine and anhydrous ammonia. In another method of preparing certain of the compounds, an alkali metal halophenol is reacted with an N-alkyl dichlorothiophosphoramide followed by reaction of the resulting intermediate with a suitable anhydrous amine or anhydrous ammonia. Until now, only the corresponding oxygen analogs have been prepared from aqueous solutions of ammonia or amines and then only in yields of about 50 percent. Thus, a method for the preparation of O-aryl phosphoroamidothioates in high yields and which is based upon the use of inexpensive aqueous ammonia or aqueous amines would be highly desirable.

One object of the present invention is to provide an improved method for the preparation of O-aryl phosphoroamidothioates. Another object is to provide a method of preparing O-aryl phosphoroamidothioates which is simpler to carry out and more economical than prior known methods. A further object is to provide a method which gives exceptionally high yields of O-aryl phosphoroamidothioates. Other objects will appear from time to time throughout the following specification and appended claims.

The new method comprises reacting a phosphorochloridothioate of the group consisting of the O-aryl phosphorodichloridothioates and O-aryl O-alkyl phosphorochloridothioates having the formula

wherein Z represents chlorine or alkoxy with an aqueous solution of ammonia, methylamine or ethylamine to displace the phosphorus bound chlorine in the phosphorochloridothioate reagent. The reaction is carried out with a sufficient excess of the ammonia or amine reagent to act as acceptor for by-product hydrogen chloride. Good results are obtained when employing at least two molecular proportions of ammonia or amine with one molecular proportion of the O-aryl O-alkyl phosphorochloridothioate or with 0.5 molecular proportion of the O-aryl phosphorodichloridothioate. The reaction is carried out in the presence of an inert organic solvent and conveniently in an inert water miscible solvent. Upon completion of the reaction, the desired product may be separated in conventional fashion. This new process gives greater yields of the O-aryl phosphoroamidothioates than previously have been obtainable by known methods.

Although the details of the reaction mechanism are not completely understood, the reaction when carried out under the described conditions results in the substitution of the phosphorus bound chlorine atoms of the O-aryl phosphorodichloridothioate or O-aryl O-alkyl phosphorochloridothioate with amido groups and the formation of the amine hydrochloride as a by-product. The reaction might be represented as taking place in accordance with the following equations in which $R_1$ represents an alkyl group.

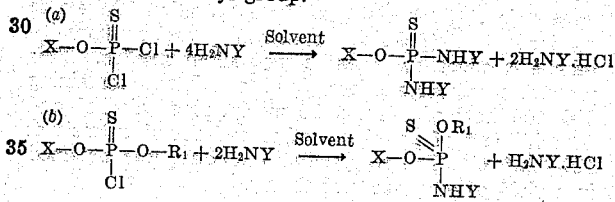

The contacting of the phosphorochloridothioate reagent and aqueous solution of ammonia or amine is carried out in a polar solvent such as acetone and methyl ethyl ketone, or in the presence of a non-polar solvent such as benzene, carbon tetrachloride and methylene chloride.

The reaction of the present invention is exothermic and takes place smoothly and readily at the temperature range of from —10° C. to 30° C. The temperature may be controlled by regulating the rate of contacting the solution of aqueous ammonia or aqueous amine with the phosphorochloridothioate reagent and by external cooling. Temperatures in excess of 30° C. materially reduce the yields of the desired products and should not be employed for any appreciable period of time.

The rate at which the reaction takes place has been found to vary directly with the temperature employed. At 15° C. the reaction is essentially complete in about one-half hour. At the lower temperatures, reaction periods up to two hours may be required. It is usually preferred to operate at temperatures of from 5° to 20° C.

Although the proportions of the reagents to be employed are not critical, the use of a small stoichiometric excess of the ammonia or amine reagent is preferred to assure complete reaction. Thus, it is preferred that an amount of phosphorochloridothioate reagent sufficient to supply one molecular proportion of phosphorus bound chlorine be reacted with at least four molecular proportions of ammonia or amine.

In carrying out the method of the present invention, an aqueous solution of the ammonia or amine reagent is added portionwise to the phosphorochloridothioate reagent dissolved in the reaction solvent. The addition is carried out with stirring and at a temperature of from —10° to 30° C. Following the addition, the reaction mixture is usually stirred for a short period to insure completion of the reaction. Upon completion of the reaction, the reaction product is washed with water to separate ammonia or amine hydrochloride. If the reaction is carried out in a water miscible solvent, the washing step leaves the desired product as a residue. If the reaction is carried out in one of the water immiscible solvents, the solvent may be removed by fractional distillation under reduced pressure following the washing step to obtain the desired product as a liquid or crystalline residue.

The following examples illustrate the invention, but are not to be construed as limiting.

EXAMPLE 1

O-(3,4-dichlorophenyl) phosphorodiamidothioate

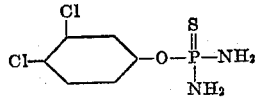

60.0 grams (0.2 mole) of O-(3,4-dichlorophenyl)phosphorodichloridothioate was dissolved in 300 milliliters of benzene. To this solution was added slowly with stirring a 26 percent aqueous solution of ammonia containing 21.2 grams (1.25 mole) of ammonia. The addition was carried out over a period of one hour and at a temperature of from 10°–20° C. Stirring was thereafter continued for one hour at room temperature to complete the reaction. The reaction mixture was then washed with water and the benzene removed by evaporation. As a result of these operations there was obtained an O-(3,4-dichlorophenyl) phosphorodiamidothioate product as a white crystalline residue. This product was recrystallized from a mixture containing 200 milliliters of toluene, 30 milliliters of alcohol and 10 milliliters of petroleum ether and found to melt at 129–130° C. The recrystallized product was obtained in a yield of 90 percent of theory.

EXAMPLE 2

O-(4-chlorophenyl) N,N'-diethyl phosphorodiamidothioate

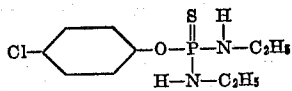

52 grams (0.2 mole) of O-(4-chlorophenyl) phosphorodichloridothioate was dissolved in 300 milliliters of benzene. To this solution was added slowly with stirring a 25 percent aqueous solution of monoethylamine containing 36 grams (0.8 mole) of monoethylamine. The addition was carried out over a period of one hour and at a temperature of from 10°–25° C. Stirring was then continued for one hour and the reaction mixture thereafter washed with water. Upon evaporation of the benzene solvent, there was obtained an O-(4-chlorophenyl) N,N'-diethyl phosphorodiamidothioate product as a white crystalline residue. This product was recrystallized from ethanol and found to melt at 99°–100° C. The recrystallized product was obtained in a yield of 82 percent of theory.

EXAMPLE 3

O-(3,4-dichlorophenyl) N,N'-dimethyl phosphorodiamidothioate

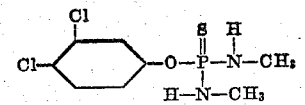

A 25 percent aqueous solution of monomethylamine containing 62 grams (2.0 moles) of monomethylamine was added portionwise with stirring to 119 grams (0.4 mole) of O-(3,4-dichlorophenyl) phosphorodichloridothioate dissolved in 400 milliliters of benzene. The addition was carried out over a period of one hour and at a temperature of from 5°–25° C. The reaction mixture was then processed as described in Example 2 to obtain an O-(3,4-dichlorophenyl)N,N'-dimethyl phosphorodiamidothioate product as a while crystalline residue. This product was recrystallized from ethanol and found to melt at 60°–61° C. The recrystallized product was obtained in a yield of 78 percent of theory.

EXAMPLE 4

O-(3,4-dichlorophenyl) O-methyl N-methyl phosphoroamidothioate

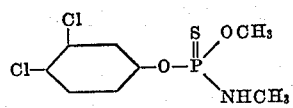

55 grams (0.2 mole) of O-(3,4-dichlorophenyl) O-methyl phosphorochloridothioate was dissolved in 100 milliliters of acetone. To this solution was added slowly with stirring a 25 percent aqueous solution of monomethylamine containing 12.4 grams (0.4 mole) of monomethylamine. The addition was carried out over a period of one hour and at a temperature of from 5°–10° C. Stirring was continued for 30 minutes after the addition of the amine solution. The reaction mixture was then diluted with methylene chloride, and the resulting mixture washed with water. Upon evaporation of the methylene chloride, an O-(3,4-dichlorophenyl) O-methyl N-methyl phosphoroamidothioate was obtained as a yellow oil in a yield of 92 percent of theory. This product had a density of 1.3914 at 25° C. and a refractive index n/D of 1.5662 at 25° C.

EXAMPLE 5

O-(2-cyclohexylphenyl) O-methyl phosphoroamidothioate

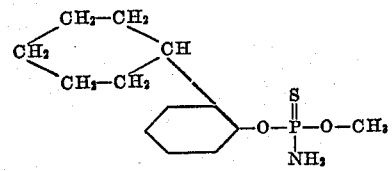

In a 1 liter, 3-necked flask fitted with a stirrer, dropping funnel and thermometer was placed a solution of 60.8 grams (0.2 mole) of O-(2-cyclohexylphenyl) O-methyl phosphorochloridothioate in 100 milliliters of acetone. To this solution was added over a period of one hour 30 grams of a 26 percent aqueous solution of ammonia. The addition was carried out with stirring and at a temperature of from 4° to 7° C. Stirring was continued for 15 minutes after the addition, and the reaction mixture thereafter processed as described in Example 4 to obtain an O-(2-cyclohexylphenyl) O-methyl phosphoroamidothioate product as a yellow oil. This product was obtained in a yield of 95 percent of theory and had a density of 1.179 at 25° C. and a refractive index n/D of 1.5582 at 25° C.

EXAMPLE 6

O-(2,4,5-trichlorophenyl) O-ethyl phosphoroamidothioate

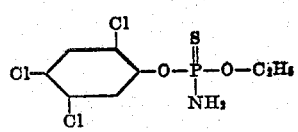

In a manner similar to that of the previous example, 17 grams (0.05 mole) of O-(2,4,5-trichlorophenyl) O-ethyl phosphorochloridothioate was dissolved in 35 milliliters of acetone and contacted below 10° C. with a slight stoichiometric excess of a 26 percent aqueous solution of ammonia. As a result of these operations, an O-(2,4,5-trichlorophenyl) O-ethyl phosphoroamidothioate product was obtained in 81.5 percent yield as a pale yellow liquid which solidified on cooling. The melting point was 57°–59° C.

EXAMPLE 7

*O-(4-methoxyphenyl) O-methyl N-ethyl phosphoroamidothioate*

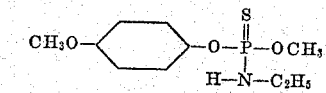

In a flask equipped with a stirrer, dropping funnel and thermometer was placed 50.5 grams (0.2 mole) of O-(4-methoxyphenyl) O-methyl phosphorochloridothioate dissolved in 200 milliliters of benzene. To this solution over a one hour period was added dropwise a 25 percent aqueous solution of monoethylamine containing 18 grams (0.4 mole) of monoethylamine. The addition was carried out with stirring and at a temperature of from 5° to 15° C. Stirring was continued for 10 minutes after the addition and the reaction mixture thereafter washed with water. Upon evaporation of the solvent, there was obtained an O-(4-methoxyphenyl) O-methyl N-ethyl phosphoroamidothioate product as a pale yellow oil. The product was obtained in a yield of 96 percent of theory and had a density of 1.2017 at 25° C. and a refractive index n/D of 1.5455 at 25° C.

In a similar manner, the novel method of the present invention may be employed to obtain the very desirable and improved yields of other O-aryl phosphoroamidothioates as follows:

O-(2,4-dichlorophenyl) phosphorodiamidothioate (melting point=102°–104° C.) by the reaction of O-(2,4-dichlorophenyl) phosphorodichloridothioate and aqueous ammonia.

O-(4-cyclohexylphenyl) phosphorodiamidothioate melting point=158°–159° C.) by the reaction of O-(4-cyclohexylphenyl) phosphorodichloridothioate and aqueous ammonia.

O-(4-cumenyl) phosphorodiamidothioate (melting point=110°–113° C.) by the reaction of O-(4-cumenyl) phosphorodichloridothioate and aqueous ammonia.

O-(4-ethoxyphenyl) N,N'-diethyl phosphorodiamidothioate (melting at 74°–75° C.) by the reaction of O-(4-ethoxyphenyl) phosphorodichloridothioate and aqueous monoethylamine.

O-(4-chlorophenyl) O-methyl N-ethyl phosphoroamidothioate ($d_4^{25}$=1.2489; $n_D^{25}$=1.5478) by the reaction of O-(4-chlorophenyl) O-methyl phosphorochloridothioate and aqueous monoethylamine.

O-(2-bromo-4-tertiarybutylphenyl) O-methyl N-ethyl phosphoroamidothioate ($d_4^{25}$=1.2782; $n_D^{20}$=1.5479)

by the reaction of O-(2-bromo-4-tertiarybutylphenyl) O-methyl phosphorochloridothioate and aqueous monoethylamine.

O-(2,4,5-trichlorophenyl) O-methyl N-ethyl phosphoroamidothioate (melting point=37°–39° C.) by the reaction of O-(2,4,5-trichlorophenyl) O-methyl phosphorochloridothioate and aqueous monoethylamine.

O-(3-biphenylyl) O-methyl phosphoroamidothioate ($d_4^{25}$=1.2824; $n_D^{25}$=1.6055) by the reaction of O-(3-biphenylyl) O-methyl phosphorochloridothioate and aqueous ammonia.

O-(4-methoxyphenyl) O-methyl phosphoroamidothioate ($d_4^{25}$=1.3281; $n_D^{25}$=1.5532) by the reaction of O-(4-methoxyphenyl) O-methyl phosphorochloridothioate and aqueous ammonia.

O-(2-chloro-4-tertiary butyl phenyl) O-methyl phosphoroamidothioate ($d_4^{25}$=1.3210; $n_D^{25}$=1.5432) by the reaction of O-(2-chloro-4-tertiary butyl phenyl) O-methyl phosphorochloridothioate and aqueous ammonia.

O-(4-benzylphenyl) O-dodecyl phosphoroamidothioate by the reaction of O-(4-benzylphenyl) O-dodecyl phosphorochloridothioate and aqueous ammonia.

O-(2,4,5-tribromophenyl) O-secondarybutyl phosphoroamidothioate by the reaction of O-(2,4,5-tribromophenyl) O-secondarybutyl phosphorochloridothioate and aqueous ammonia.

O-(2,4-dichlorophenyl) O-ethyl phosphoroamidothioate by the reaction of O-(2,4-dichlorophenyl) O-ethyl phosphorochloridothioate and aqueous ammonia.

The O-aryl phosphorodichloroidothioates employed as starting materials may be prepared by reacting a molecular excess of phosphorus thiochloride (PSCl₃) with an alkali metal phenate. Good results are obtained when employing from two to four moles of phosphorus thiochloride per mole of phenate. The phenate, preferably as the sodium salt, is added portion-wise with stirring to the phosphorus thiochloride and the mixture subsequently warmed for a short period to complete the reaction. The crude reaction mixture is then filtered and the filtrate fractionally distilled under reduced pressure to separate the product.

The O-aryl O-alkyl phosphorochloridothioate starting materials may be prepared by the reaction of one molecular proportion of an O-aryl phosphorodichloridothioate with one molecular proportion of an anhydrous alkali metal alcoholate at a temperature of from 30° to 110° C. The reaction is carried out in a solvent such as methylene chloride or benzene. Upon completion of the reaction, the reaction mixture is washed and the solvent removed by distillation under reduced pressure to obtain the desired product as a residue.

What we desire to particularly point out and distinctly claim as our invention is:

1. A method for the manufacture of a phosphoroamidothioate having the formula

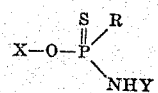

wherein X represents a phenyl radical whose aromatic nucleus contains at least one substituent selected from the group consisting of chlorine, bromine, lower alkyl, lower alkoxy, benzyl, phenyl and cyclohexyl; Y represents a member of the group consisting of hydrogen and lower alkyl, and R represents a member of the group consisting of —NHY and alkoxy, which comprises reacting a phosphorochloridothioate selected from the group consisting of the O-aryl phosphorodichloridothioates and O-aryl O-alkyl phosphorochloridothioates with an ammonia compound of the group consisting of ammonia, methylamine, and ethylamine, the ammonia compound being employed in aqueous solution and the reaction being carried out in the presence of an inert organic solvent and at a temperature of from —10° to 35° C.

2. A method claimed in claim 1 wherein at least four molecular proportions of the ammonia compound are employed with an amount of the phosphorochloridothioate reagent sufficient to supply one molecular proportion of phosphorus bound chlorine.

3. A method claimed in claim 1 wherein a small stoichiometric excess of the ammonia compound is employed.

4. A method as claimed in claim 2 in which the phosphorochloridothioate is O-(2,4-dichlorophenyl) phosphorodichloridothioate.

5. A method as claimed in claim 2 in which the phosphorochloridothioate is O-(4-chlorophenyl) phosphorodichloridothioate.

6. A method as claimed in claim 2 in which the phosphorochloridothioate is O-(2,4,5-trichlorophenyl) O-methyl phosphorochloridothioate.

7. A method as claimed in claim 2 in which the phosphorochloridothioate is O-(2,4-dichlorophenyl) O-methyl phosphorochloridothioate.

8. A method as claimed in claim 2 in which the phosphorochloridothioate is O-(2,4,5-trichlorophenyl) O-ethyl phosphorochloridothioate.

References Cited in the file of this patent

UNITED STATES PATENTS

| | | |
|---|---|---|
| 2,552,538 | Drake et al. | May 15, 1951 |
| 2,552,574 | Moyle et al. | May 15, 1951 |

OTHER REFERENCES

Kosolapoff: "Organo-Phosphorus Compounds," John Wiley & Sons, N. Y., p. 280 (1950).